United States Patent Office 3,193,689
Patented July 6, 1965

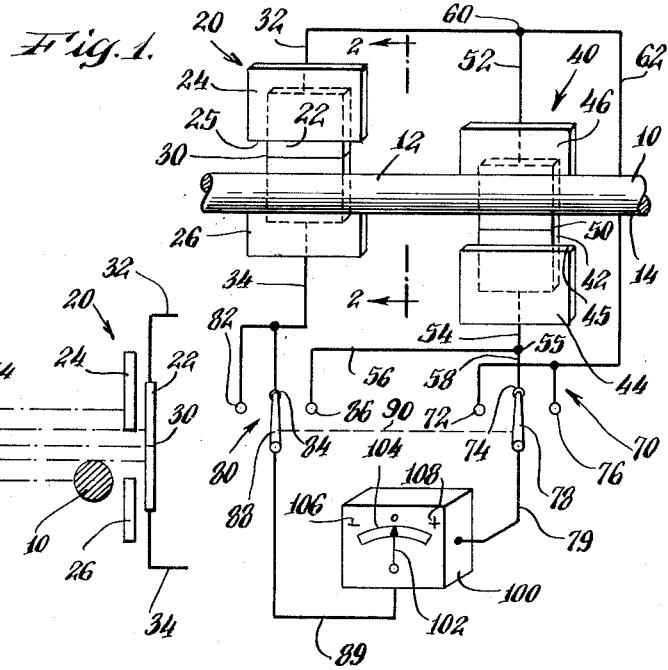

3,193,689
PHOTOSENSITIVE WIRE DIAMETER GAUGE
Maxwell A. Kerr, Ridgefield, Conn., assignor to The Perkin-Elmer Corporation, Norwalk, Conn., a corporation of New York
Filed Mar. 24, 1961, Ser. No. 98,096
8 Claims. (Cl. 250—219)

This invention relates to a non-contacting gauge for the determination of the diameter or width of fine wires or filaments or other moving stock. The invention provides a device for monitoring the diameter of a fine wire on the order of .01 to .05 inch and yields high precision quantitative measurements of any error in the diameter without being effected by weaving or other small displacements of the wire being measured. More specifically, the invention provides a high precision gauge which monitors each edge of the wire or filament to produce separate signals indicative of each edge and then combining these signals in such a manner as to eliminate by subtraction the parts of these signals which are contributed solely by movement of the entire wire but preserving those parts of these signals which are contributed by actual variation of the diameter of the wire.

Prior art devices having the same general purpose as the apparatus of the invention may be divided into two classes. The first class uses a feeler member to locate the edge of the wire or similar filament being monitored while a second type of device utilizes a beam of light or other measuring means which can be characterized as non-contacting. Both types of instruments have previously been subject to great drawbacks when utilized to gauge the diameter of extremely fine wires or the like. As the physical size of the wire being monitored decreases, devices of the contacting type become more and more difficult to design because of the need to utilize finer and finer feeler members. On the other hand, devices of the non-contacting type do not readily lend themselves to extremely fine measurements because of the problems of sufficient signal-to-noise ratio in the entire system utilized. That is, as the physical sensitivity desired increases, the signal generated by small errors becomes proportionately smaller while the unwanted signals (i.e., noise) do not decrease at the same rate.

The device of the invention, which is of the non-contacting type, obviates most of the problems existing in the prior art by the utilization of an extremely sensitive position-indicating means and a novel connection of the output thereof so as to eliminate the unwanted signals without imparing in any way the great sensitivity of the detectors to the diameter deviations intended to be measured. In fact, as will later appear, the device uses essentially a null detecting technique and actually increases the high innate sensitivity of the detectors utilized by a factor of 2.

An object of the invention therefore is the provision of a wire diameter measuring means which has great useful sensitivity so as to be capable of measuring fine wires to a high degree of precision.

Another object of the invention is the provision of a wire or similar strip diameter or width monitoring means which is insensitive to lateral displacement of the wire but is extremely sensitive to any diameter changes thereof.

Another object of the invention is the provision of such a wire diameter measuring device which, although highly sensitive, is relatively inexpensive and simple to manufacture and use.

Other objects and advantages of the invention will become obvious to one skilled in the art upon reading the following specification and studying the accompanying drawings in which:

FIG. 1 is a perspective of the apparatus looking generally in the direction of the light beam utilized therewith;

FIG. 2 is a transverse section taken generally on the lines 2—2 of FIG. 1 and showing the light source;

FIG. 3 is a front elevational view partly broken away of the apparatus with the monitored wire transversely displaced; and FIG. 4 is a showing similar to FIG. 3 in which the wire diameter has actually decreased.

In FIG. 1 the monitored wire 10 is shown positioned in front of two detector assemblies 20 and 40, respectively. The left-hand detector assembly 20 is composed of a semiconducting bicrystal 22 and masking means 24 and 26, and the right-hand detector assembly 40 is composed of similar semiconductor 42 and masking means 44 and 46. These semiconductor bicrystals 22 and 42 may be of the type more fully disclosed in the U.S. Patent No. 2,795,742 to W. G. Pfann. As more fully disclosed in this patent, these semiconductive bicrystals have the property of generating a voltage when a light beam strikes the surface thereof. More specifically, the semiconductors will produce a voltage which depends on the position of a constant width light beam relative to the natural grain boundary (shown at 30 and 50 respectively in FIG. 1). As indicated in FIG. 9 of said patent, the voltage produced increases rapidly as the light beam approaches this natural grain boundary junction and has a sign indicative of the side of this boundary which the light beam is on. For a certain size light beam traversing the crystal from one end to the other, the voltage will increase as the light beam starts moving from one end of the crystal toward the natural grain boundary, will reach a maximum when the light beam is just tangent to the boundary, will decrease rapidly when the light beam is partly on each side of the boundary until a zero voltage is produced when the light beam is centered thereon, and will then symmetrically produce the same voltages but with oposite sign as the light beam passes to the other side of the boundary on its way to the opposite end of the crystal. The present invention uses this type of bicrystal in a different manner, namely, with a varying width light beam.

The device of the invention shown in FIG. 1 utilizes this semiconductive bicrystal by initially positioning the lower edge 25 of mask 24 at the same distance above the natural grain boundary junction 30 as the upper edge 12 of the wire 10 is below this boundary 30. Therefore a light beam at least as wide as the space between the lower edge 25 of mask 24 and the upper edge 12 of wire 10, impinging upon the bicrystal 22, will produce a net voltage of zero since the voltage generated by the part of the bicrystal above the boundary 30 will be exactly offset by the voltage produced by that part of the bicrystal therebelow. The voltage produced at the upper end of the bicrystal is lead by wire 32 to junction point 60 and then by wire 62 to outer contact terminals 72, 76 of switch 70. The other end of the bicrystal 22 is connected to wire 34 and thence to the left-hand contacts 82, 84 of a second switch 80 having contact blade 88. This switching member 88 and the switching member 78 of the first switch are mechanically connected by means of linkage 90 so that movement of the two switches is always made coincidently.

The right-hand bicrystal 42 is so set up that the upper edge 45 of mask 44 is the same distance from its boundary 50 as is the lower edge 14 of wire 10 so that a beam impinging upon the area between this lower edge 14 of the wire and the upper edge 45 of the mask will produce a net voltage of zero from bicrystal 42. The voltage output from the upper end of bicrystal 42 is fed by wire 52 to the same junction point 60 so as to be lead by wire 62 to the outer taps 72 and 76 of switch 70. The lower end of bicrystal 42 is connected by wire 54 to junction point 55 and thence through wire 56 to tap 86 and by wire 58 to tap 74. Switching member 88 is connected by wire 89 to one side of millivoltmeter 100, and switching member 78 is connected to the other side thereof by wire 79. This millivoltmeter has indicator 102 and calibrated scale 104 for indicating the voltage thereacross. Calibrated scale 104 is of the center zero type, that is, will register both negative and positive values of voltage applied across the meter as indicated by the minus sign 106 and plus sign 108 at the ends of this scale.

The setting up and calibrating of the instrument is facilitated by the multi-contact switches 70 and 80 in the following manner. The switching members 78 and 88 are first thrown to their left-hand position so as to connect contacts 72 and 82 to the wires 79 and 89, respectively, leading to meter 100. In this position the lower end of the left-hand bicrystal semiconductor 22 will be connected through wire 34, contact 82, switching element 88 and wire 89 to one side of the meter; and the upper end of the same bicrystal 22 will be connected to wire 32, junction point 60, wire 62, contact 72, switching member 78 and wire 79 to the other side of the meter. In this position, the left-hand detector is physically adjusted so as to produce a zero voltage on meter 100, thereby assuring that the lower edge 25 of mask 24 is the same distance above the grain boundary 30 as the upper edge 12 of wire 10 is therebelow. In order to cause this balance condition, the entire detector assembly may be mounted for longitudinal movement or alternatively mask 24 may be so mounted. Preferably the whole detector is moved so as to maintain the spacing of lower edge 25 of the mask from the grain boundary constant. After the adjustment of the left-hand detector assembly 20, switch members 78 and 88 are thrown to the right-hand position so as to connect contacts 76 and 86, respectively, to meter input leads 79 and 89. In this position of the switches, the bottom of the right-hand semiconductive bicrystal 42 is connected through wire 54, junction point 55, wire 56, contact 86, switching member 88 and input wire 89 to one side of meter 100; and the upper side of this bicrystal 42 is connected to wire 52, junction 60, wire 62, contact 76, switching member 78 and input lead 79 to the other side of the meter. The entire right-hand detector assembly 40 (or else mask 44) is now longitudinally adjusted so as to produce a zero voltage across the meter, thereby making the area between the lower edge 14 of the wire and natural grain boundary 50 equal to that area between said boundary and the upper edge 45 of mask 44. The device is now set up for monitoring of the wire 10 when the operator moves switching members 78 and 88 to their central position for the monitoring mode of operation.

Movement of the ganged switching members to their central position will connect the lower part of the left-hand bicrystal 22 through lead 34, contact 84, switching member 88, and input lead 89 to one side of the meter 100. The upper end of the left-hand bicrystal 22 is connected by lead 32 to junction point 60, and then by wire 52 to the upper end of right-hand semiconductor bicrystal 42. It should be noted that wire 62, being connected only to the open contacts 72 and 76 does not complete any circuits in this mode of operation. The lower end of the right-hand bicrystal 42 is connected by wire 54 through junction point 55, wire 58, contact 74, switching member 78 and input wire 79 to the other side of meter 100. In this mode wire 56 leads solely to open contact 86 and therefore also completes no circuit. Thus a circuit is completed from one side of meter 100 to one end of bicrystal 22, to the other end thereof, to one end of bicrystal 42, to the other end thereof, and then to the other side of meter 100, so that the bicrystals are connected in a series arrangement with each other across meter 100.

Before explaining the operation of the device in this monitor position, the manner of the light beam impinging on the bicrystal will first be described with reference to FIG. 2. In FIG. 2 light source 110 emits light which is collimated by collimating means such as lens 112 to form a parallel beam bounded by rays 114 and 116. These rays impinge upon the bicrystal in the manner shown in FIG. 2 wherein the wire 110 and the mask 24 limits the width of the beam of rays that actually reaches the bicrystal 22. Mask 26 is positioned with its upper edge level with the center of wire 10 so as to keep any stray illumination from reaching the lower part of the bicrystal. Although only the light source and collimating means for the left-hand detector assembly 20 is shown in FIG. 2, it is obvious that the system for the right-hand detector assembly 40 may be substantially identical. In fact, since the position of the bicrystal 42 is below the wire rather than above, as is the case with bicrystal 22, the optical arrangement of the two bicrystals is substantially symmetrical about the center line of the wire 10. Thus, by simply turning FIG. 2 upside down, it will represent the arrangement of light source and collimating means for bicrystal 42, including the correct relative positions of its masks and the wire 10. Alternatively, a single source and collimating means may be utilized with additional means, such as mirrors, to direct equal parts of the collimated light emanating from the light source to each of the exposed parts of the two bicrystals. This latter arrangement has the advantage of eliminating any effect of fluctuations in the intensity of the light source.

The operation of the device will now be described with reference to FIGURES 3 and 4, which show, respectively, movement of the wire up and a decrease in the wire diameter. Should the wire be displaced or weave upwardly as shown in FIG. 3, the area between the boundary 30 of bicrystal 22 and the upper edge 12 of the wire will decrease while, of course, the width of the area between the boundary 30 and the lower edge 25 of mask 24 will remain the same. Since the area on each side of the boundary of this bicrystal which is illuminated is no longer equal, the bicrystal will produce a net voltage indicated by the minus sign 120 at the lower end of the bicrystal and the plus sign 122 at its upper end. At the same time the width of the illuminated area between the central natural grain boundary 50 of bicrystal 42 and the lower edge 14 of the wire 10 will increase while the width of the area between the boundary 50 and the upper edge 45 of mask 44 will remain unchanged. Since bicrystal 42 is purposely similarly oriented to bicrystal 22, this will produce a plus voltage at its upper end (which has the greater illumination) and a minus voltage at its lower end as indicated by the plus sign 132 and the minus sign 130, respectively. Since these bicrystals are connected in opposing series relationship by wire 32, junction 60 and wire 52, the net voltage produced across the meter 100 will be zero. The reason that the voltages will be exactly equal is that the amount of illuminated area in each crystal changed by a shift of wire 110 will be the same and that response of the bicrystal is substantially linear at least near its natural grain boundary junction. To the extent that non-linearity of response may give a false indication in a particular set-up, conventional network circuit means may be utilized to make the voltages equal to each other upon displacement of the wire. It is, of course, obvious that although the wire is shown as moving upwardly as illustrated by the arrows 134 and 136, movement of the wire downwardly would produce the same net effect on meter 100 (i.e., no voltage) since each of the signs 120, 122, 130 and 132 would be opposite to each other and of same magnitude. It might be also noted that the wire is shown as being displaced in a direction perpendicular to its original movement, but this diagram is also representative of almost any possible generally upward motion of the wire as long as the two detector assemblies 20 and 40 are placed quite close to each other along the wire, as will be the case in use.

In FIG. 4 the wire diameter dimension is decreased so that the area between the wire and the natural grain boundaries of each of the bicrystals 22 and 42 will increase while the width of the area between these respective boundaries 30 and 50 and the respective masks 24 and 44 will not change. Therefore each of the bicrystals will produce a voltage represented by the signs 140 and 142 at the ends of bicrystal 22 and the signs 150 and 152 at the ends of bicrystal 42. The sense or sign of the voltage developed by the bicrystal 42 will in this instance be the same as that developed in FIG. 3 (as comparison of the right side of these two figures will show); but the sense or sign of the voltage developed by the lefthand bicrystal 22 will be opposite to that shown in FIG. 3. Therefore, the voltages produced by each of the bicrystals 22 and 42 will now add because of the series circuit created by wire 32, junction point 16 and wire 52 on the one hand, and the lead wires 34 (connected to meter input wire 79) and lead wire 54 (connected to input wire 89). Therefore assuming that the wire decreases in diameter as suggested by the arrows 160 and 162 in FIG. 4, the voltage across meter 100 will be the sum of the voltages from each of the bicrystals which will be twice the voltage of either alone.

It should be noted that not only will the direction of diameter change cause deflection of the meter needle either to one side or the other, thus giving a qualitative indication of whether the wire is under or over the desired diameter, but also the meter will read a quantitative measurement of how much the wire deviates from the desired diameter. Thus, as will be obvious from FIG. 4, should the wire diameter increase, each of the signs 140, 142, 150 and 152 will be changed so that the needle 102 of the meter 100 will be deflected in the opposite direction by an amount depending on the increase in the diameter of wire 10.

As may be seen from FIG. 9 of the aforementioned U.S. Patent No. 2,795,742, the sensitivity of the semiconductive bicrystals is such that deviations from a desired diameter of only a single mil (one-thousandth of an inch) will produce a sufficient voltage to be detected by millivoltmeter 100.

However, the wire diameter monitoring system of the invention need not be utilized solely for wires but, on the contrary, may be utilized to monitor the width of any more or less opaque material. Thus, various textile or other filaments, narrow bands of material, and indeed any strip-like material may be monitored by the disclosed system. Although the primary objective of the disclosed system is to allow extremely precise measurements of fluctuations in the width of the material, it is not at all necessary that the actual overall diameter or width of the material being monitored be so small. Thus, the device may be utilized for monitoring quite broad strips of material, since the device does not depend in any manner upon what the actual width of the material is, but will give extremely sensitive and precise measurement of very small width or diameter changes of any overall width material.

Since many obvious modifications may be made in the disclosed system, the invention is not limited to the specific system shown, but, on the contrary, is limited solely by the scope of the appended claims.

I claim:

1. A highly sensitive width gauge for determining the distance between opposite lateral edges of an elongated article, which is moving in the direction of its longitudinal axis, comprising: at least one light source, positioned on one side of said article so as to illuminate an area including a part of each of said lateral edges; two photosensitive devices on the side of said article remote from said light source and with their photosensitive surfaces facing said light source; each of said photosensitive devices being of the type which produces an output voltage varying by both sign and magnitude according to the part and extent of the photosensitive surface which is illuminated; one of said photosensitive devices being so positioned and oriented relative to one longitudinal edge of said article that movement of said one edge toward and away from the longitudinal center line of said article causes the change in the output voltage of said one device to have a first electrical polarity and a second opposite electrical polarity, respectively; the other of said photosensitive devices being so positioned and oriented relative to the other edge of said article that movement of said other edge toward and away from said article center line causes the change in the output voltage of said other device to have a third and fourth electrical polarity, respectively, said fourth polarity being opposite to said third polarity; voltage responsive means for indicating the output of said photosensitive devices; and circuit means connecting said photosensitive devices to said voltage responsive indicating means in such manner as to cause said indicating means to respond only to a particular linear arithmetic combination of said first and third polarity voltages and the same linear arithmetic combination of said second and fourth polarity voltages, but to the opposite linear arithmetic combination of said first and second polarity voltages and of said third and fourth polarity voltages; said particular and said opposite arithmetic combinations being such that movement of both said edges of said article toward and away from said center line cause additive effect of said output voltages on said indicating means, but movement of either of said edges toward said center line while said other edge moves away from said center line causes an effect on said indicating means proportional to the difference of said output voltages, so that said indicating means is insensitive to any transverse movement of said article but will indicate any actual change in width of said article even though it be moving transversely also.

2. A width gauge according to claim 1, in which said voltage responsive means is sensitive to the direction of the net voltage impressed thereon so that said voltage responsive means will indicate the direction of relative movement of said edges of said article, thereby indicating whether the width of said article has increased or decreased.

3. A width gauge according to claim 1, in which said voltage responsive means has quantitative response to change in net voltage so as to yield an indication of the extent of the change in width of said article.

4. A width gauge according to claim 1, in which said voltage responsive means is capable of indicating both the direction and magnitude of the net voltage impressed thereupon so as to yield a measure of both the direction and degree of any change in the width of said article.

5. A highly sensitive width gauge for determining the distance between opposite lateral edges of an elongated article, which is moving in the direction of its longitudinal axis, comprising: at least one light source, positioned on one side of said article so as to illuminate an area including a part of each of said lateral edges; two photosensitive devices on the side of said article remote from said light source and with their photosensitive surfaces facing said light source; each of said photosensitive devices being of the type which produce an output voltage varying by both sign and magnitude according to the part and extent of the photosensitive surface which is illuminated; one of said photosensitive devices being so positioned and oriented relative to one longitudinal edge of said article that movement of said one edge toward and away from the longitudinal center line of said article causes the change in the output voltage of said one device to have a first electrical polarity and a second opposite electrical polarity, respectively; the other of said photosensitive devices being so positioned and oriented relative to the other edge of said article that movement of said other edge toward and away from said article center line causes the change in the output voltage of said other device to have a third and fourth electrical polarity, respectively, said fourth polarity being opposite to said third polarity; voltage responsive means for indicating the output of said photosensitive devices; and branched circuit means including switching means for completing a first and second calibration circuit connecting each of said photosensitive devices separately to said voltage responsive indicating means so as to indicate the magnitude and electrical polarity of each of the output voltages of said photosensitive devices separately for initially setting up each of said photosensitive devices in such position and standard width that each produces no voltage for a certain position of said article, and for subsequently completing an operating circuit connecting both of said photosensitive devices to said voltage responsive indicating means in such manner as to produce no voltage across said indicating means when said edges of said article move in the same direction and to the same extent from said certain position but producing a net voltage across said indicating means when said edges move in any other manner so that said indicating means is then insensitive to any transverse movement of said article but will indicate any actual change in width of said article even though it be moving transversely also; said operating circuit comprising means for connecting said output indicating means to the output voltages of both of said photosensitive devices simultaneously in such manner as to cause said indicating means to respond only to a particular linear arithmetic combination of said first and third polarity voltages and the same linear arithmetic combination of said first and third polarity voltages and the same linear arithmetic combination of said second and fourth polarity voltages, but to the opposite linear arithmetic combination of said first and second polarity voltages and of said third and fourth polarity voltages; said particular and said opposite arithmetic combinations being such that movement of both said edges of said article toward and away from said center line causes additive effect of said output voltages on said indicating means, but movement of either of said edges toward said center line while said other edge moves away from said center line causes an effect on said indicating means proportional to the difference of said output voltages.

6. A width gauge according to claim 1, in which said photosensitive devices comprise photosenstive bicrystals of the natural grain boundary type, which produce output voltages varying by both sign and magnitude according to the part and extent of their photosensitive surfaces which are illuminated.

7. A highly sensitive width gauge for determining the distance between opposite lateral edges of an elongated article, which is moving in the direction of its longitudinal axis, comprising: at least one light source, positioned on one side of said article so as to illuminate an area including a part of each of said lateral edges; two photosensitive bicrystals on the side of said article remote from said light source and with their photosensitive surfaces facing said light source; each of said photosensitive bicrystals having a natural grain boundary dividing the photosensitive surface thereof into two photosensitive sections, each section producing an output voltage which varies in magnitude according to the extent said section is illuminated but with the voltage opposite in sign to the voltage produced by the other section; one of said photosensitive bicrystals being so positioned that one edge of said article shadows part of one of the photosensitive sections of said one bicrystal while leaving exposed to illumination part of said one section and all of the other photosensitive section thereof; the other photosensitive bicrystal being so positioned that the other edge of said article shadows part of one of the photosensitive sections of said other bicrystal while leaving exposed to illumination part of said one section and all of the other photosensitive section thereof; the exposed parts of said one photosensitive sections of each of said bicrystals being equal to each other for a certain centered position of said article; masking means between each of said bicrystals and said article and positionable so as to shadow the other photosensitive sections of each of said bicrystals so as to leave exposed to illumination a part of each of said other sections equal to said exposed parts of said one sections when said article is in said certain centered position and of standard width; voltage responsive means for indicating the output of said photosensitive bicrystals; and branched circuit means including switching means for completing a first and second calibration circuit connecting the outputs of each of said photosensitive bicrystals separately to said voltage responsive indicating means in such manner as to cause the absolute value of the voltage component generated by said one section to be substracted from the absolute value of the voltage component generated by said other section of the same bicrystal for initially setting up each of said photosensitive devices and said masking means in such relation to said article that the illuminated parts of said one section and said other section for each crystal produce equal but opposite voltages at said certain centered position and standard width of said article so that each bicrystal produces no net voltage, and for subsequently completing an operating circuit connecting both of said photosensitive bicrystals to said voltage responsive indicating means in such manner as to produce no voltage across said indicating means when said edges of said article move in the same direction and to the same extent from said certain centered position but producing a net voltage across said indicating means when said edges move in any other manner so that said indicating means is insensitive to any transverse movement of said article but will indicate any change in actual width of said article even though accompanied by transverse movement thereof said operating circuit comprising means for connecting said indicating means to the output voltages of both of said bicrystals simultaneously in such manner as to cause said indicating means to respond to the sum of the absolute values of the bicrystal output voltages generated by both of said one sections being simultaneously shadowed by the respective article edges to an extent differing in the same sense from that shadowed by said standard width article in said centered position, but to cause said indicating means to respond to the difference of the absolute values of the bicrystal output voltages generated by a first of said one sections being shadowed more by one article edge and the other said one section being shadowed less by the other article edge than shadowed by said standard width article in said centered position.

8. A highly sensitive width gauge for determining the distance between opposite lateral edges of an elongated article, which is moving in the direction of its longitudinal axis, comprising: at least one light source, positioned on one side of said article so as to illuminate and area including a part of each of said lateral edges; two photosensitive bicrystals on the side of said article remote from said light source and with their photosensitive surfaces facing said light source; each of said photosensitive bicrystals having a natural grain boundary dividing the photosensitive surface thereof into two photosensitive sections, each section producing an output voltage which varies in magnitude according to the extent said section is illuminated but with the voltage opposite in sign to the voltage produced by the other section; one of said photosensitive bicrystals being so positioned that one edge of said article shadows part of one of the photosensitive sections of said one bicrystal while leaving illuminated part of said one section and all of the other photosensitive section thereof; the other photosensitive bicrystal being so positioned that the other edge of said article shadows part of one of the photosensitive sections of said other bicrystal while leaving illuminated part of said one section and all of the other photosensitive section thereof; the illuminated parts of said one photosensitive sections of each of said bicrystals being equal to each other for a certain centered position of said article;

masking means between each of said bicrystals and said light source and positionable so as to shadow the other photosensitive sections of each of said bicrystals so as to leave illuminated a part of each of said other sections equal to said illuminated parts of said one sections when said article is in said certain centered position and of standard width; voltage responsive means for indicating the output of said photosensitive bicrystals; and circuit means for connecting the outputs of both of said photosensitive bicrystals to said voltage responsive indicating means in such manner as to cause said indicating means to respond to the sum of the absolute values of the bicrystal output voltages generated by both of said one sections being simultaneously shadowed by the respective article edges to an extent differing in the same sense from that shadowed by said standard width article in said centered position, but to cause said indicating means to respond to the differences of the absolute values of the bicrystal output voltages generated by a first of said one sections being shadowed more by one article edge and the other said one section being shadowed less by the other article edge than shadowed by said standard width article in said centered position, so that said indicating means is insensitive to any transverse movement of said article but will indicate any change in actual width of said article even though accompanied by transverse movement thereof.

References Cited by the Examiner

UNITED STATES PATENTS

| | | | |
|---|---|---|---|
| 2,237,811 | 4/41 | Cockrell | 88—14 |
| 2,474,906 | 7/49 | Meloon | 88—14 |
| 2,548,590 | 4/51 | Cook | 88—14 |
| 2,641,712 | 6/53 | Kircher | 250—209 X |
| 2,670,651 | 3/54 | Burns et al. | 88—14 |
| 2,699,701 | 1/55 | Strother et al. | 250—219 X |
| 2,730,006 | 1/56 | Gottschall | 88—14 |
| 2,740,901 | 4/56 | Graham | 250—217 X |
| 2,777,069 | 1/57 | Saeman | 250—210 X |
| 2,812,685 | 11/57 | Vossberg | 250—219 |
| 2,931,917 | 4/60 | Beelitz | 88—14 |
| 3,038,079 | 6/62 | Mueller | 250—203 |

RALPH G. NILSON, *Primary Examiner.*

MAX L. LEVY, WALTER STOLWEIN, *Examiners.*